(12) United States Patent
McKenney

(10) Patent No.: US 9,606,829 B2
(45) Date of Patent: Mar. 28, 2017

(54) SUSPENDING TRANSACTIONAL-MEMORY TRANSACTIONS WITHOUT STACK CORRUPTION

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

(*) Notice: Subject to any disclaimer, the term of this patent is extended or adjusted under 35 U.S.C. 154(b) by 346 days.

(21) Appl. No.: 14/512,408

(22) Filed: Oct. 11, 2014

(65) Prior Publication Data

US 2016/0085549 A1 Mar. 24, 2016

Related U.S. Application Data

(63) Continuation of application No. 14/492,774, filed on Sep. 22, 2014.

(51) Int. Cl.
*G06F 9/46* (2006.01)

(52) U.S. Cl.
CPC ............... *G06F 9/46* (2013.01); *G06F 9/467* (2013.01)

(58) Field of Classification Search
CPC ................................... G06F 9/46; G06F 9/467
See application file for complete search history.

(56) References Cited

U.S. PATENT DOCUMENTS 6,219,666 B1  4/2001  Krishnaswamy et al.

2011/0296148 A1  12/2011  Cain, III et al.
2012/0246658 A1  9/2012  Arndt et al.

OTHER PUBLICATIONS

Click, "And now some hardware transactional memory comments . . . ", Cliff Click's Blog, <http://www.azulsystems.com/blog/cliff-click/2009-02-25-and-now-some-hardware-transactional-memory-comments>, Feb. 25, 2009, 8 pages.
Dice et al., "Early experience with a commercial hardware transactional memory implementation", Fourteenth International Conference on Architectural Support for Programming Languages and Operating Systems (ASPLOS '09), Mar. 2009, pp. 157-168.
Herlihy et al., "Transactional memory: Architectural support for lock-free data structures", The 20th Annual International Symposium on Computer Architecture, May 1993, pp. 289-300.

(Continued)

*Primary Examiner* — Benjamin Geib
(74) *Attorney, Agent, or Firm* — Walter W. Duft

(57) ABSTRACT

A technique for suspending transactional memory transactions without stack corruption. A first function that begins a transactional memory transaction is allocated a stack frame on a default program stack, then returns. Prior to suspending the transaction, or after suspending the transaction but prior to allocating any suspended mode stack frames, either of the following operations is performed: (1) switch from the default program stack to an alternative program stack, or (2) switch from a default region of the default program stack where the first function's stack frame was allocated to an alternative region of the default program stack. Prior to resuming the transaction, or after resuming the transaction but prior to allocating any transaction mode stack frames, either of the following operations is performed: (1) switch from the alternative program stack to the default program stack, or (2) switch from the alternative stack region to the default stack region.

7 Claims, 5 Drawing Sheets

(56) References Cited

OTHER PUBLICATIONS

Jacobi et al., "Transactional memory architecture and implementation for IBM System z", The 45th Annual IEEE/ACM International Symposium on MicroArchitecture, Dec. 2012, 22 pages.

McKenney, "Transactional memory everywhere: Htm and cache geometry", <http://paulmck.livejournal.com/tag/ransactional%20memory%20everywhere>, Jun. 10, 2012, 4 pages.

Merritt, "Ibm plants transactional memory in cpu", EE Times, <http://www.eetimes.com/electronics-news/4218914/IBM-plants-transactional-memory-in-CPU>, Aug. 19, 2011, 3 pages.

Ramadan et al., "Metatm/txlinux: transactional memory for an operating system", SIGARCH Comput. Archit. News, 35 (2):92-103, Jun. 2007, 12 pages.

Swift et al., "Os support for virtualizing hardware transactional memory", 3rd ACM SIGPLAN Workshop on Transactional Memory (TRANSACT), Feb. 2008, 10 pages.

Rossbach et al., "TxLinux: Using and Managing Hardware Transactional Memory in an Operating System", SOSP'07, Oct. 14-17, 2007, 15 pages.

International Business Machines Corporation, "List of IBM Patents or Patent Applications Treated as Related" Oct. 12, 2014, 2 pages.

| | txbegin() | | bar() | | txcommit() | |
|---|---|---|---|---|---|---|
| foo() | foo() | foo() | foo() | foo() | foo() | foo() |

FIG. 1 (Prior Art)

| | | | bar() suspend | | | |
|---|---|---|---|---|---|---|
| | txbegin() | | | | txcommit() | |
| foo() | foo() | foo() | foo() | foo() | foo() | foo() |

FIG. 2 (Prior Art)

| | | bar()<br>suspend | | | | |
|---|---|---|---|---|---|---|
| | txbegin() | | | | txabort() | garbage!! |
| foo() | foo() | foo() | foo() | foo() | foo() | foo() |

FIG. 3 (Prior Art)

| | txbegin() | | bar() | | txabort() | txbegin() |
|---|---|---|---|---|---|---|
| foo() | foo() | foo() | foo() | foo() | foo() | foo() |

FIG. 4 (Prior Art)

SUSPENDING TRANSACTIONAL-MEMORY TRANSACTIONS WITHOUT STACK CORRUPTION

This application is a continuation under 35 U.S.C. 120 of application Ser. No. 14/492,774, filed Sep. 22, 2014.

BACKGROUND

1. Field

The present disclosure relates to computer systems and methods in which data resources are shared among data consumers while preserving data integrity and consistency relative to each consumer. More particularly, the invention concerns the use of transactional memory for memory reference operations.

2. Description of the Prior Art

By way of background, transactional memory allows a system to execute a group of memory-reference operations as if they ran atomically with respect to other transactions in that same system. Recently, hardware transactional memory implementations have started appearing, but all of these enforce limits on transaction memory footprint, which is the set of memory locations that the transaction has read from or written to. These limits are determined by hardware resources such as cache size, store-buffer entries, and TLB entries. Unfortunately, these hardware implementations are not generally able to distinguish between memory private to a given CPU (such as stack, per-CPU variables, thread-local storage, and so on) and memory shared among CPUs (such as global variables and heap storage). One reason that hardware implementations are not able to make this sort of distinction is that there are exceptions, for example, a given CPU might publish a pointer to some of its on-stack data, which would mean that such data would need to be tracked if used in a transaction.

The foregoing limitation is especially troublesome for transactions that need to manipulate a large quantity of private data, for example, when initializing a large block of shared memory that is being published by the transaction. If the memory block is large enough, the hardware transaction will have an unnecessarily high probability of failure.

One way to avoid this problem is to allow transactions to be suspended. Any changes to memory made while a transaction is suspended do not count against the transaction's memory footprint. After the non-transactional operation has completed, the transaction may be resumed, and this transaction might subsequently succeed or fail. Transaction suspension may also be used to implement thread-level speculation, in which suspension is used to communicate state from one iteration to the next.

FIGS. 1 and 2 illustrate the difference between a normal and a suspended transaction. In both figures, time advances from left to right and the program stack grows in the upward direction. In both figures, there is a function foo( ) that invokes a library function txbegin( ) to start a transaction. This library function returns, at which point foo( ) invokes a function bar( ). In a normal transaction (FIG. 1), bar( )'s memory footprint must remain small in order to avoid aborting the transaction due to cache overflow. In contrast, a suspended transaction (FIG. 2) can have a much larger memory footprint because memory references during suspended mode do not count against any limits to the transaction's footprint. In both cases, bar( ) returns to foo( ), which then invokes the library function txcommit( ) to commit the transaction.

However, the code that runs while the transaction is suspended must be careful to avoid writing to any memory that is within the transaction's memory footprint. If the suspended-mode code overwrites any locations within the transaction's memory footprint, the transaction may be unable to properly roll back the contents of those locations upon a subsequent abort. This eventuality is equivalent to data corruption, and must thus be avoided. This problem is illustrated in FIG. 3. The sequence of calls is the same as before, except that bar( ), running in transaction suspend mode, overwrites the memory locations previously used by txbegin( )'s stack frame. This negates the ability of the transactional-memory hardware to restore state to txbegin( ), resulting in garbage as shown in the upper right.

In contrast, a normal transaction does not suffer from this problem. As shown in FIG. 4, because bar( ) overwrites txbegin( )'s stack frame in transactional mode, the txabort( ) can restore txbegin( )'s stack frame, allowing state to be rolled back to before the transaction started.

The inability to handle suspended-mode overwriting interferes with abstraction. To see this, consider the situation shown in the figures, where transaction entry and exit are implemented using library functions that use the stack, writing data onto the stack that is overwritten by the calling function. As shown in FIG. 4, this is not a problem when the calling function is still executing transactionally, so the stack locations will be restored should the transaction abort. But as shown in FIG. 3, this safety net does not apply while the transaction is suspended, which means that if the suspended code performs a function call that overlays the portion of stack used by the transaction-enter library function, a later transaction abort will corrupt the stack.

The present disclosure proposes a mechanism that permits suspending transactions without risk of data corruption upon a subsequent transaction abort.

SUMMARY

A method, system and computer program product are provided for performing operations to suspend transactional memory transactions without stack corruption. In an embodiment, a first function is invoked that begins a transactional memory transaction, the first function being allocated a first function stack frame on a default program stack. The first function thereafter returns and its first function stack frame is deallocated. Prior to suspending the transaction, or after suspending the transaction but prior to allocating any suspended mode stack frames, either of the following operations is performed: (1) switch from the default program stack to an alternative program stack, or (2) switch from a default region of the default program stack where the first function stack frame was allocated to an alternative region of the default program stack. Prior to resuming the transaction, or after resuming the transaction but prior to allocating any transaction mode stack frames, either of the following operations is performed: (1) switch from the alternative program stack to the default program stack, or (2) switch from the alternative region of the default program stack to the default region of the default program stack.

In an embodiment, the alternative program stack is established by allocating memory in one of the memory devices or by creating an array variable stored in memory, and by storing an alternative stack pointer in a processor register or in memory.

In an embodiment, the switching from the default program stack to the alternative program stack comprises saving a current stack pointer for the default program stack that is stored in a processor stack pointer register, and writing the alternative stack pointer to the stack pointer register.

In an embodiment, the operation of (1) switching from the default program stack to the alternative program stack comprises checking whether the alternative program stack is already in use, and if so, either aborting the transaction or refusing enter suspended mode.

In an embodiment, the operation of (1) the switching from the default region of the default program stack to the alternative region of the default program stack comprises resetting a stack pointer for the default program stack from a default stack pointer value that points to a location in the default region to an alternative stack pointer value that points to a location in the alternative region, and (2) the operation of switching from the alternative region of the default program stack to the default region of the default program stack comprises resetting the stack pointer for the default program stack from the alternative stack pointer value to the default stack pointer value.

In an embodiment, the alternative stack pointer value is determined by maintaining a high water mark of stack usage in the default region of the default program stack by the first function that starts the transaction.

In an embodiment, an artificial stack frame is allocated at a base of the alternative program stack or the alternative region of the default program stack, the artificial stack frame being used to transfer control to an error handler if an attempt is made to resume the transaction without switching from the alternative program stack to the default program stack or from the alternative region of the default program stack to the default region of the default program stack.

BRIEF DESCRIPTION OF THE DRAWINGS

The foregoing and other features and advantages will be apparent from the following more particular description of example embodiments, as illustrated in the accompanying figures.

FIG. 1 is a functional block diagram for a prior art system showing changes occurring in a stack during a prior art transaction that is initiated by a txbegin( ) library function, which does not suspend, and which ends with a successful transaction commit performed by a txcommit( ) library function.

FIG. 2 is a functional block diagram for a prior art system showing changes occurring in a stack during a prior art transaction that is initiated by a txbegin( ) library function, which is suspended by a function called bar( ), and which ends with a successful transaction commit performed by a txcommit( ) library function.

FIG. 3 is a functional block diagram for a prior art system showing changes occurring in a stack during a prior art transaction that is initiated by a txbegin( ) library function, which is suspended so that a function called bar( ) can run, and which is aborted by a txabort( ) library function, but cannot rollback due to txbegin( )'s stack frame having been corrupted by stack data written by the bar( ) function in suspended mode.

FIG. 4 is a functional block diagram for a prior art system showing changes occurring in a stack during a prior art transaction that is initiated by a txbegin( ) library function, which does not suspend, and which is successfully aborted by a txabort( ) library function, and then reinitiated by the txbegin( ) library.

DETAILED DESCRIPTION OF EXAMPLE EMBODIMENTS

Figure 5:
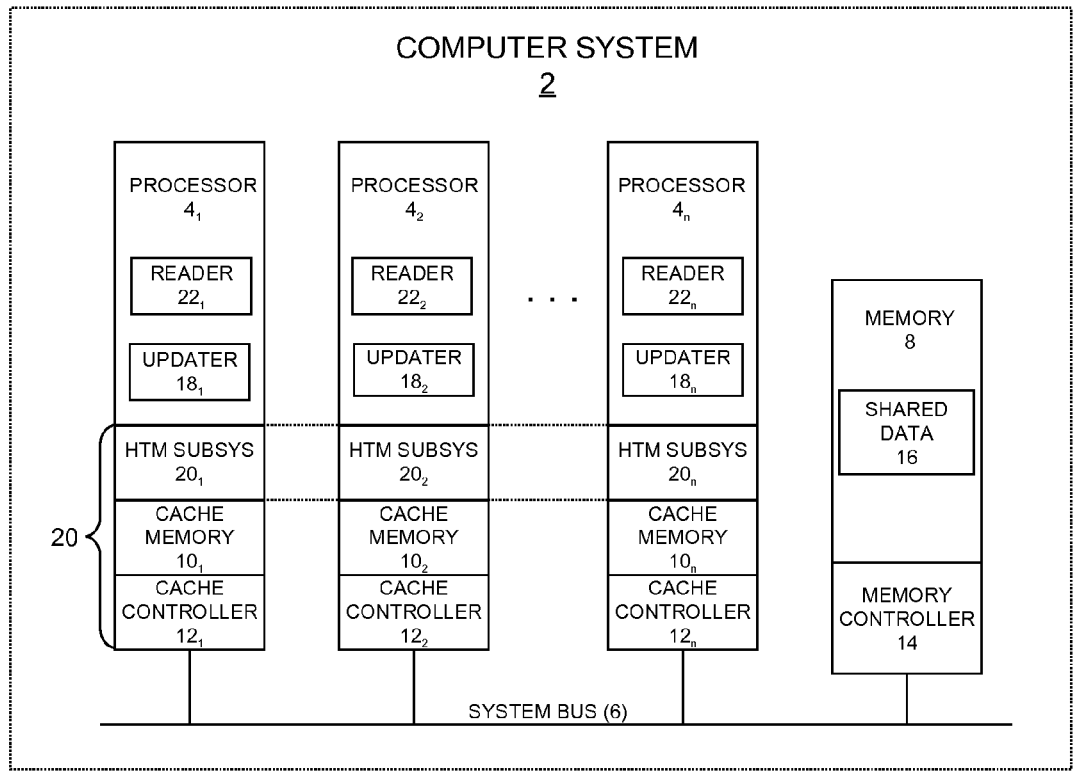
FIG. 5 is a functional block diagram showing an example computer system that implements data readers, data updaters, and a TM subsystem.

Turning now to the figures, wherein like reference numerals represent like elements in all of the several views, FIG. 5 illustrates an example computer system 2 that may be used to implement the technique disclosed herein. Although the computer system 2 is shown as being a multiprocessor system, a uniprocessor computer system could also be used. The computer system 2 includes a plurality of processors $4_1$, $4_2 \ldots 4_n$, a system bus 6, and a program memory 8. There is also cache memory that includes cache memory instances $10_1, 10_2 \ldots 10_n$, and corresponding cache controllers $12_1, 12_2 \ldots 12_n$, respectively associated with the processors $4_1, 4_2 \ldots 4_n$. A memory controller 14 is associated with the memory 8. As shown, the memory controller 14 may reside separately from processors $4_2 \ldots 4_n$ (e.g., as part of a chipset). Alternatively, the memory controller 14 could be provided by plural memory controller instances respectively integrated with the processors $4_2 \ldots 4_n$ (as is known in the art). The memory 14 includes memory controller logic for supporting local access to the shared memory 8 by any of the processors $4_2 \ldots 4_n$.

The computer system 2 may represent any of several different types of computing apparatus. Such apparatus may include, but are not limited to, general purpose computers, special purpose computers, portable computing devices, communication and/or media player devices, set-top devices, embedded systems, to name but a few. The processors $4_1, 4_2 \ldots 4_n$ may each be a single-core CPU device. Alternatively, the processors $4_1, 4_2 \ldots 4_n$ could represent individual cores within a multi-core CPU device. Each CPU device embodied by any given processor 4 is operable to execute program instruction logic under the control of a software program stored in the memory 8 (or elsewhere). The memory 8 may include any type of tangible storage medium capable of storing data in computer readable form (computer readable storage medium), including but not limited to, any of various types of random access memory (RAM), various flavors of programmable read-only memory (PROM) (such as flash memory), and other types of primary storage. The processors $4_1, 4_2 \ldots 4_n$ may be situated within a single computing device or node (e.g., as part of a single-node SMP system) or they may be distributed over plural nodes (e.g., as part of a NUMA system, a cluster, a cloud, etc.).

Update operations (updaters) 18 may periodically execute within a process, thread, or other execution context (hereinafter "task") on any processor 4. In FIG. 5, reference numerals $18_1, 18_2 \ldots 18_n$ illustrate individual updaters that may respectively execute on the several processors $4_1, 4_2 \ldots 4_n$. Each updater 18 runs from program code stored in the memory 8 (or elsewhere) in order to periodically perform updates on a set of shared data 16 that may be stored in the shared memory 8 (or elsewhere). The updates performed by the updaters 18 may include modifying elements of a linked list, inserting new elements into the list, deleting elements from the list, and many other types of operations (involving lists or other data structures).

The updaters 18 may perform their updates to the shared data 16 using a Hardware Transactional Memory (HTM) subsystem 20 that operates in the computer system 2. In FIG. 1, reference numerals $20_1, 20_2 \ldots 20_n$ illustrate individual HTM subsystem instances that may respectively execute on the several processors $4_1, 4_2 \ldots 4_n$. The HTM subsystem 20 is shown as including the cache memories 10 and the cache controllers 12, because portions of the cache memory 10 may be dedicated to transaction usage, and because the cache controllers 12 may implement logic that supports storing and maintaining a transaction's read and write sets. The HTM subsystem 20 may further include software logic stored in the memory 8 (e.g., to facilitate API interaction), and may also include HTM instruction support in the processors $4_1, 4_2 \ldots 4_n$.

The HTM subsystem 20 implements updates to the shared data 16 as serialized transactions that tend to be atomic, consistent, isolated, and to some extent durable. Each transaction either completes successfully without conflict with other transactions, in which case the transaction is committed, or it does not complete, in which case the transaction is aborted and rolled back. Roll back is performing by reverting the transaction state changes and reclaiming the memory locations used to hold uncommitted data written during the transaction.

The HTM subsystem 20 implements load and store instructions that operate on a transaction's read and write sets. As persons skilled in the art will appreciate, a transaction's read set and write set respectively represent the shared memory values that have been read and written during a transaction. The HTM subsystem 20 also manages transaction state as a transaction proceeds to the point where it either commits or fails. A transaction will typically commit only if no other transaction has updated any location in the transaction's read or write set, and no other transaction has read any location in the transaction's write set. To make this determination, the HTM subsystem 20 may implement any suitable form of conflict detection. When a transaction commits, the transaction's changes to its write set become finalized. If the commit fails, the transaction aborts. A transaction abort causes all changes to the transaction's write set (i.e., the uncommitted transaction data) to be discarded. This is known as a roll back. Finally, the HTM subsystem 20 has the ability to suspend and resume transactions at any point during execution thereof, for example, to allow other code to execute while the transaction is suspended.

Read operations (readers) 22 may periodically execute within a process, thread, or other execution context (hereinafter "task") on any processor 4. In FIG. 5, reference numerals $22_1, 22_2 \ldots 22_n$ illustrate individual readers that may respectively execute on the several processors $4_1, 4_2 \ldots 4_n$. Each reader 22 runs from program code stored in the memory 8 (or elsewhere) in order to periodically perform read operations on the set of shared data 16 that may be stored in the shared memory 8 (or elsewhere). In some cases, the readers 22 may access the shared data 16 as part of a transaction implemented using the HTM subsystem 20.

A transaction involving a reader 22 may also include a data update operation involving an updater 18.

When an updater 18 uses the HTM subsystem 20 to carry out an update, and modifies a cache line, a pre-transaction version of the modified data may be conventionally retained in one or more cache lines as part of the transaction's write set so that the transaction can be rolled back if needed. This pre-transaction cache line data may be discarded once the transaction either aborts (in which case its value is retained) or commits (in which case its value is discarded).

Figure 6:
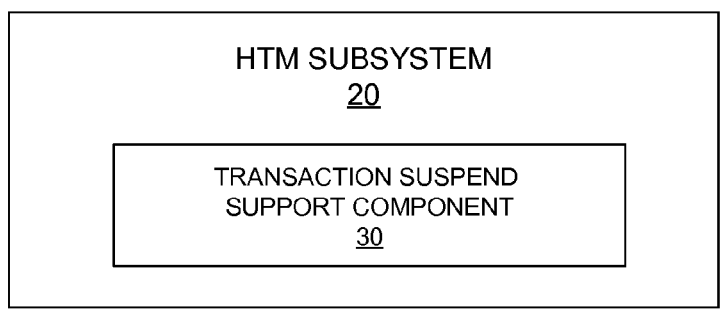
FIG. 6 is a functional block diagram showing a transaction suspend support component of the TM subsystem of FIG. 5.

As discussed in the Background section above, corruption of a program stack (hereinafter "stack") can occur when the primitive used to enter a transactional memory transaction is implemented as a function with a stack frame, and when the transactional code invokes another function with a stack frame while the transaction is suspended. The present disclosure envisions a solution wherein the HTM subsystem 20 is provided with a transaction suspend support component 30 (see FIG. 6) that supports transaction suspension in a manner that prevents stack corruption in the foregoing situation. The transaction suspend support component 30 may be embodied in several ways. One approach is to use an alternative stack for suspension mode code. Another approach is to use an alternative stack region for such code.

Figure 7:
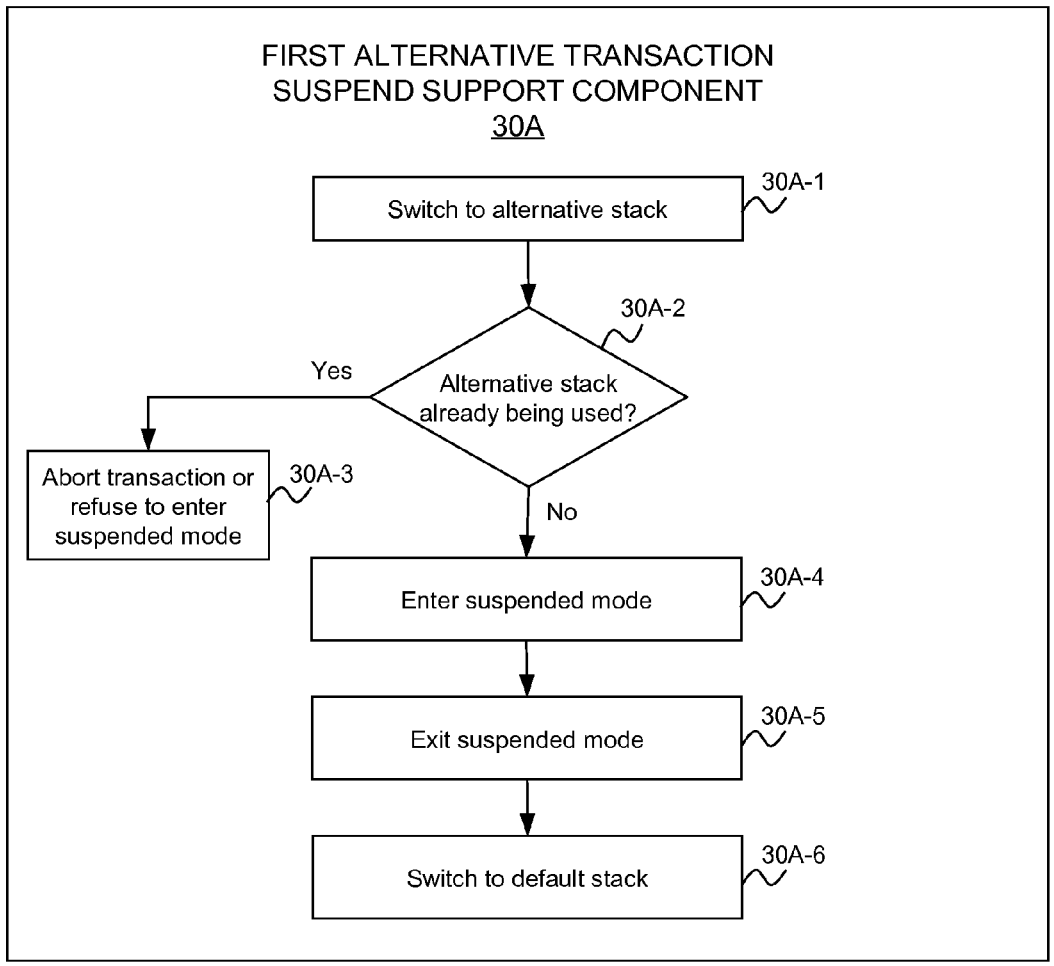
FIG. 7 is a flow diagram showing operations according to a first example embodiment of the transaction suspend support component of FIG. 6.

The first approach is illustrated by a first alternative implementation 30A of the transaction suspend support component 30, which is shown in FIG. 7. The first alternative implementation 30A uses an alternative stack for suspended mode operations. In block 30A-1, immediately prior to transaction suspension, a switch is made to an alternative per-thread (or per-CPU) stack, such as the alternative program stack 42 shown in FIG. 8 (and discussed below). Alternatively, the order of stack-switching and transition to suspended mode may be reversed, but only as long as the suspended mode code sequences do not overwrite any data in the transaction's memory footprint (which includes any on the default stack). The alternative stack may be created in any suitable manner, including allocation via malloc( ) or providing a dedicated array variable, to obtain the needed memory. The stack pointer for the alternative stack can be stored in a suitable location (such as an available processor register or memory location) until needed, then written to the processor's stack pointer (SP) register to effect the switch. For most processor architectures, the alternative stack pointer will initially point to the high-address end of the memory region used for the alternative stack, allowing normal push and pop instructions to be used for manipulating data on the alternative program stack. The last default stack pointer value being used when the stack switch is implemented will be saved in order to restore state when switching back to the default stack upon exit from suspended mode.

In block 30A-2, a check is made to determine if the alternative stack is already being used (for example, if the suspended mode contained another transaction that was in turn suspended). Note that not all hardware supports nesting of suspended transactions. Thus, block 30A-2 is only needed for hardware that does provide such support. If block 30A-2 determines the alternative stack is in use, block 30A-3 is reached. This block may be implemented in two ways. One option is to abort the transaction. Another option is to refuse entry into suspended mode. Note that these options can result in unnecessary transaction aborts, but will still fit transactional semantics. If block 30A-2 determines that the alternative stack is not being used, suspended mode is entered in block 30A-4 and the suspended mode code is run using the alternative stack.

Following execution of the suspended mode code, block 30A-5 exits suspended mode and block 30A-6, switches back to the default stack. Alternatively, the order of the stack-switch back to the default stack and the transition out of suspended mode to resume the transaction may be reversed, but only as long as the suspended mode code sequences do not overwrite any data in the transaction's memory footprint (which includes any on the default stack).

Figure 8:
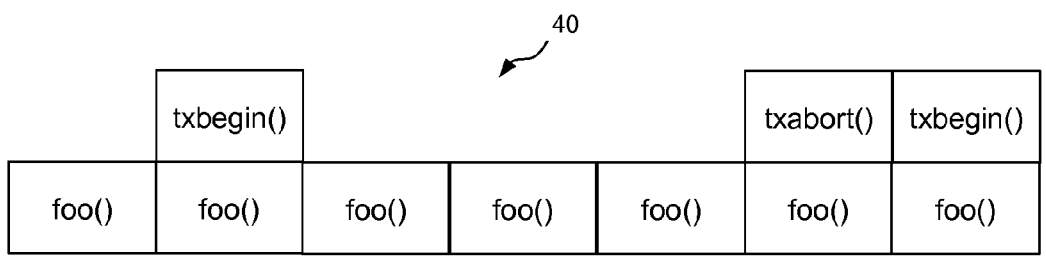
FIG. 8. is a functional block diagram showing changes in a stack resulting from the operations of FIG. 7.

FIG. 8 illustrates the effects of the foregoing operations. In FIG. 8, there is a function foo( ) that is using a default stack 40. The foo( ) function invokes a library function txbegin( ) to start a transaction. This library function returns, at which point the transaction is suspended and the bar( ) function is invoked in suspended mode. However, due the first alternative transaction suspend support component 30A, the bar( ) function is allocated a stack frame on an alternative stack 42. This stack frame will never overwrite the memory locations of the stack frame that the txbegin( ) function used because that stack frame was in the default stack 40. After the bar( ) function returns and the transaction resumes following the exit from suspended mode, the foo( ) function has the ability to call txabort( ) if the transaction needs to be aborted. Because the bar( ) function cannot overwrite txbegin( )'s stack frame memory in suspended mode, the HTM subsystem 20 can successfully restore state to txbegin( ).

In an example embodiment, the operations of blocks 30A-1 through 30A-6 of FIG. 7 may be implemented by object code software that is compiled or assembled from source code written in any suitable computer programming language. If the object code is compiled from source code written in a high level programming language (such as the C programming language), one or more intrinsic (compiler) functions or keywords may be defined that a programmer can incorporate into a source code program to invoke the required operations. By way of example only, a compiler intrinsic may be defined that takes the code to run in suspended mode as an argument. Consider, for example, a compiler intrinsic named "txn_suspend( )" whose usage might be as follows:

txn_suspend (do_suspended_work( ), do_more_suspended_work( ));

Alternatively, a compiler keyword may be defined. The keyword would be followed by a statement block representing the suspended mode code to be run. Consider, for example, a compiler keyword named "txn_suspend" whose usage might be as follows:

```
txn_suspend {
    do_suspended_work( );
    do_more_suspended_work( ));
}
```

In either embodiment, the compiler that processes the above statements could create the alternative stack and its stack pointer, then generate one or more additional functions to perform the operations of blocks 30A-1 through 30A-6 of FIG. 7. For example, the compiler could create a pair of intrinsic functions called "txn_suspend enter (sp_alt)" and "txn_suspend_exit (sp_default)" that are respectively called when entering and exiting suspended mode. The txn_suspend enter (sp_alt) function would implement the operations of blocks 30A-1 through 30A-4 of FIG. 7. The sp_alt argument to txn_suspend_enter( ) is the initial value for the alternative stack pointer. Alternatively, the txn_suspend_enter( ) function could be called with a pointer to the beginning (low memory addresses) of the alternative stack memory region and the size of that memory region. The initial value of the alternative stack pointer could be computed from this information. The txn_suspend_exit(sp_default) function would implement the operations of blocks 30A-5 through 30A-6 of FIG. 7. The sp_default argument to txn_suspend_exit( ) is the stack pointer for the default stack that was stored when the switch was made to the alternative stack in block 34A-1 of FIG. 7. The suspended mode functions do_suspended_work( ) and do_more_suspended_work( ) would be invoked between blocks 34A-4 and 34A-5 of FIG. 7, while the transaction is suspended. Their stack frames would be created on the alternative stack, as was the case for the bar( ) function in FIG. 8.

In lieu of creating the separate txn_suspend_enter( ) and txn_suspend_exit( ) functions, the compiler could create a single function that performs all of the operations of blocks 34A-1 through 34A-6 of FIG. 7, and invokes the suspended mode code during suspended mode. Consider, for example, a function called "txn_suspend_call(sp_alt,foo,b,c)." For this function, the sp_alt argument is again the initial value for the alternative stack pointer. The remaining arguments represent a function "foo(a, b, c)" that runs in suspended mode. The txn_suspend_call( ) function would set up a stack frame on the alternative stack and enter suspended mode per blocks 30A-1 through 30A-4 of FIG. 7, then call foo (a,b,c). When foo (a,b,c) returns, txn_suspend_call( ) would exit suspended mode and switch back to the default stack, per blocks 30A-5 through 30A-6 of FIG. 7.

If the high-level programming language or the compiler supports nested functions, the compiler could create a new function that uses the alternative stack. The new function would define one or more nested functions out of the body of the txn_suspend keyword block. The compiler would then call the new function. For example, the new function could be named txn_suspend_outer( ). It would define the do_suspended_work( ) and do_more_suspended_work( ) functions (from the body of the txn_suspend keyword block) as nested functions. The nested do_suspended_work( ) and do_more_suspended_work( ) functions would have access to the same stack frame and arguments as the txn_suspend_outer( ) function insofar as nested functions are within the scope of the calling function.

Figure 9:
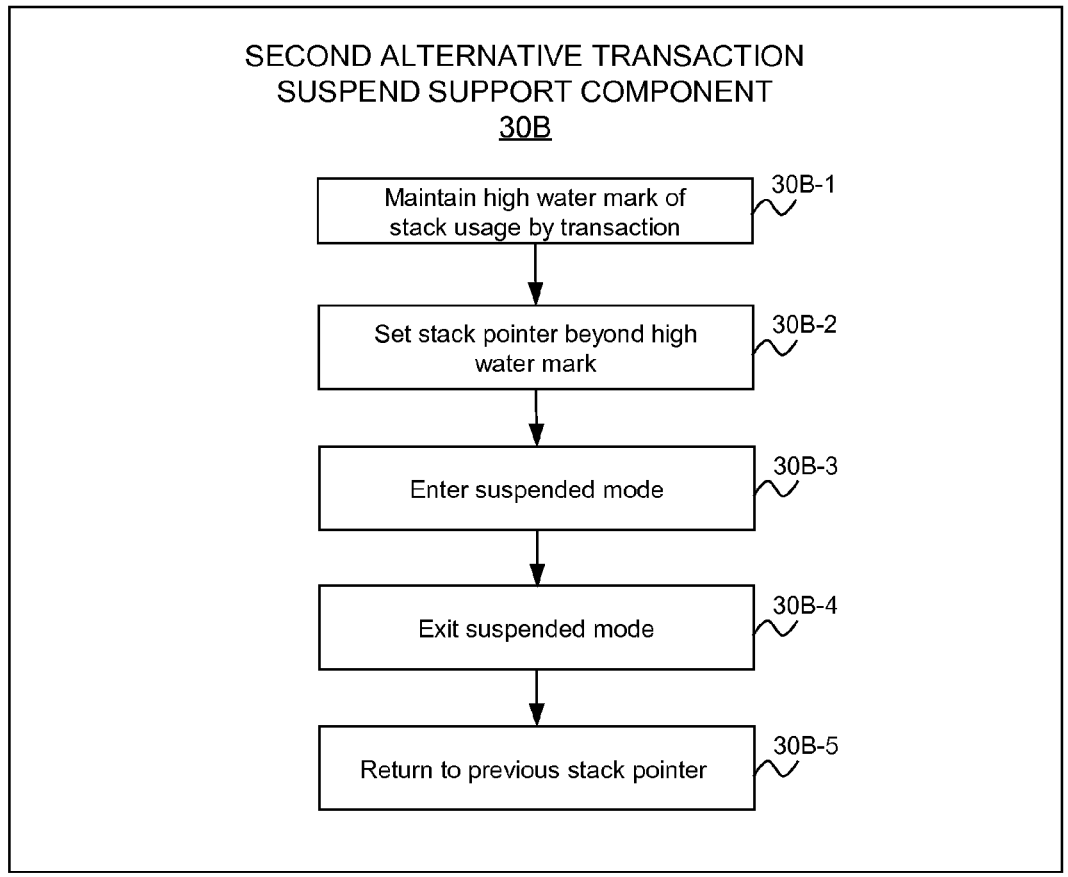
FIG. 9 is a flow diagram showing operations according to a second example embodiment of the transaction suspend support component of FIG. 6.

A second alternative implementation 30B of the transaction suspend support component 30 is shown in FIG. 9. The second alternative implementation 30B uses an alternative region of a default program stack for suspended mode operations instead of an alternative stack. The alternative stack region is located beyond a high water mark of the stack frame for the function that started the transaction (e.g. txbegin( )). In block 30B-1, a high-water mark of stack usage within a transaction is maintained in software. For example, the high-water mark could be pre-computed and stored at compile time. Alternatively, the function that started the transaction (e.g. txbegin( )) could write its high-water mark to memory, for example, in a per-thread variable, so that the transaction suspend code could find it. To suspend the transaction, block 30B-2 sets the stack pointer in an alternative stack region that lies beyond this high-water mark, and block 30B-3 enters suspended mode. After exiting suspended mode in block 30B-4, block 30B-5 restores the stack pointer to its earlier value. But if any temporaries were pushed onto the stack while the transaction was suspended, these would need to be copied down to the old stack-pointer position.

Figure 10:
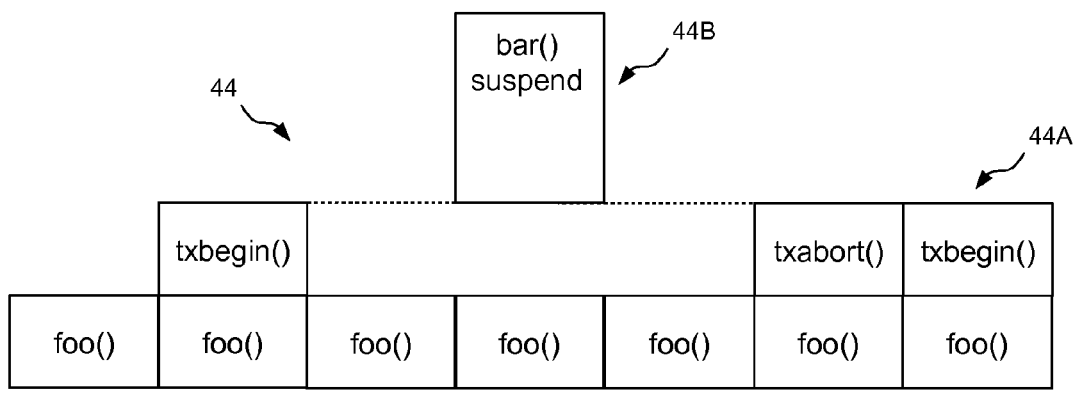
FIG. 10. is a functional block diagram showing changes in a stack resulting from the operations of FIG. 9.

FIG. 10 illustrates the effects of the foregoing operations. In FIG. 10, there is a function foo( ) that is using a default stack region 44A of a stack 44. The foo( ) function invokes a library function txbegin( ) to start a transaction. This library function returns, at which point the transaction is suspended and the bar( ) function is invoked in suspended mode. However, due the second alternative transaction suspend support component 30B, the bar( ) function is allocated a stack frame in an alternative stack region 44B of the stack 44 that lies beyond the transaction's high water mark on that stack, and therefore beyond the default stack region 44A. This stack frame will never overwrite the memory locations of the stack frame that the txbegin( ) function used because that stack frame did not extend beyond the transaction's high water mark. After the bar( ) function returns and the transaction resumes following exit from suspended mode, the foo( ) function has the ability to call txabort( ) if the transaction needs to be aborted. Because the bar( ) function cannot overwrite txbegin( )'s stack frame memory in suspended mode, the HTM subsystem 20 can successfully restore state to txbegin( ).

Optionally, the first (30A) and second (30B) implementations of the transaction suspend support component 30 may be modified with an enhancement that prevents a return from suspended mode, and a resumption of transaction processing, without performing the necessary stack operations (i.e., block 30A-6 of FIG. 7 or block 30B-5 of FIG. 9). This prohibition can be enforced by setting up an artificial stack frame at the base of the alternative stack 42 in FIG. 8 (for the first alternative transaction suspend support component 30A) or at the base of the alternative stack region 44A in FIG. 10 (for the second alternative transaction suspend support component 30B). The artificial stack frame will be encountered if an attempt is made to return from suspended mode before switching to the original stack 40 (for the first alternative transaction suspend support component 30A) or the original stack region 44A (for the second alternative transaction suspend support component 30B). This will result in control being transferred to an error handler.

Accordingly, a technique for suspending transactional memory transactions without stack corruption has been disclosed. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIG. 5-10.

The computer program product may include a computer readable storage medium (or media) having computer readable program code thereon for causing a processor to carry out aspects of the present invention. Example data storage media for storing such program code are shown by reference numerals 8 (memory) and 10 (cache) of the computer system 2 of FIG. 5. The system 2 may further include one or more secondary (or tertiary) storage devices (not shown) that could store the program code between system reboots. A further example of media that may be used to store the program code would be portable optical storage disks of the type that are conventionally used for commercial software sales, such as compact disk-read only memory (CD-ROM) disks, compact disk-read/write (CD-R/W) disks, and digital versatile disks (DVDs).

The computer readable storage medium can thus be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program code described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program code from the network and forwards the computer readable program code for storage in a computer readable storage medium within the respective computing/processing device.

Computer readable program code for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program code by utilizing state information of the computer readable program code to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program code.

These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program code may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program code may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A computer-implemented method for suspending transactional memory transactions without stack corruption, said method comprising:

invoking a first function that begins a transactional memory transaction, said first function being allocated a first function stack frame on a default program stack;

returning from said first function and deallocating said first function stack frame;

prior to suspending said transaction, or after suspending said transaction but prior to allocating any suspended mode stack frames, performing either of the following operations: (1) switching from said default program stack to an alternative program stack, or (2) switching from a default region of said default program stack where said first function stack frame was allocated to an alternative region of said default program stack; and prior to resuming said transaction, or after resuming said transaction but prior to allocating any transaction mode stack frames, performing either of the following operations: (1) switching from said alternative program stack to said default program stack, or (2) switching from said alternative region of said default program stack to said default region of said default program stack.

2. A method in accordance with claim 1, said alternative program stack is established by allocating memory in one of said memory devices or by creating an array variable stored in one of said memory devices, and by storing an alternative stack pointer in a register of one of said processors or in one of said memory devices.

3. A method in accordance with claim 2, wherein said switching from said default program stack to said alternative program stack comprises saving a current stack pointer for said default program stack that is stored in a stack pointer register of one of said processors, and writing said alternative stack pointer to said stack pointer register.

4. A method in accordance with claim 1, wherein said operation of (1) switching from said default program stack to an alternative program stack comprises checking whether said alternative program stack is already in use, and if so, either aborting said transaction or refusing to enter suspended mode.

5. A method in accordance with claim 1, wherein (1) said operation of switching from said default region of said default program stack to said alternative region of said default program stack comprises resetting a stack pointer for said default program stack from a default stack pointer value that points to a location in said default region to an alternative stack pointer value that points to a location in said alternative region, and (2) said operation of switching from said alternative region of said default stack to said default region of said default stack comprises resetting said stack pointer for said default program stack from said alternative stack pointer value to said default stack pointer value.

6. A method in accordance with claim 5, wherein said alternative stack pointer value is determined by maintaining a high water mark of stack usage in said default stack region by said first function that starts said transaction.

7. A method in accordance with claim 1, wherein an artificial stack frame is allocated at a base of said alternative program stack or said alternative region of said default program, said artificial stack frame being used to transfer control to an error handler if an attempt is made to resume said transaction without switching from said alternative program stack to said default program stack or from said alternative region of said default program stack to said default region of said default program stack.

* * * * *